S. J. ADAMS.

METHOD OF AND APPARATUS FOR FORMING MOLDS FOR CASTINGS.

No. 9,978. Reissued Dec. 20, 1881.

Witnesses:

R. Ellmshaw

R. Gwartzlander

Inventor:

S. Jarvis Adams by James L. Kay his Attorney

UNITED STATES PATENT OFFICE.

S. JARVIS ADAMS, OF PITTSBURG, PENNSYLVANIA.

METHOD OF AND APPARATUS FOR FORMING MOLDS FOR CASTINGS.

SPECIFICATION forming part of Reissued Letters Patent No. 9,978, dated Decemb 20, 1881.

Original No. 210,393, dated December 3, 1878. Application for reissue filed November 18, 1881.

DIVISION A.

*To all whom it may concern:*

Be it known that I, S. JARVIS ADAMS, of Pittsburg, in the county of Allegheny and State of Pennsylvania, have invented certain new and useful Improvements in Methods of and Apparatus for Forming Molds for Castings; and I do hereby declare that the following is a full, clear, and exact description thereof, reference being had to the accompanying drawings, which form a part of this specification.

Figure 1:
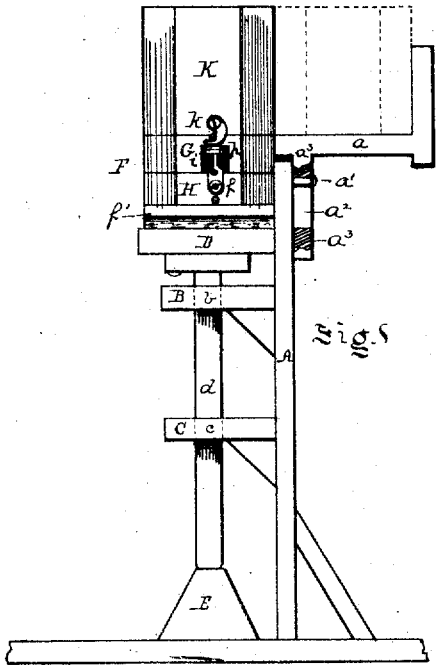
Figure 2:
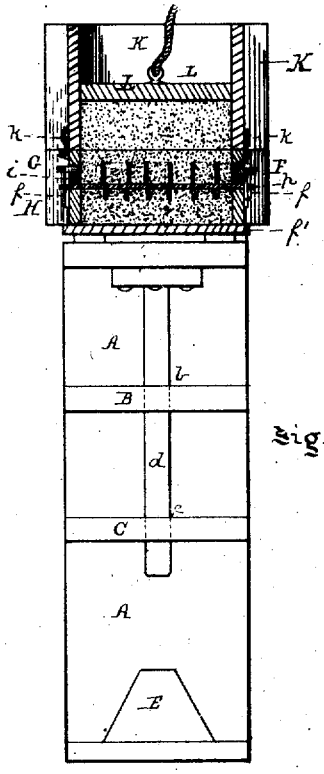
Figure 3:
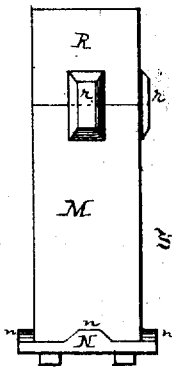
Figure 4:
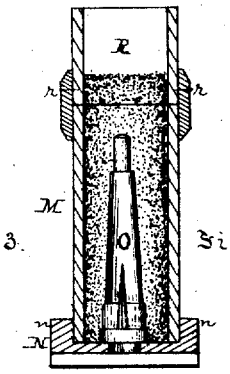
Figure 5:
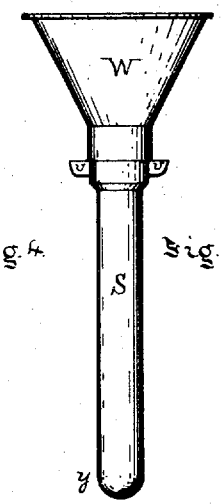

Figure 1 is a side elevation of the apparatus employed in carrying out my invention. Fig. 2 is a front view of the same, showing the apparatus in the position assumed just before jarring, and showing a vertical longitudinal section of the flask. Fig. 3 is a side view of a flask, illustrating my invention as applied to the manufacture of tubular articles. Fig. 4 is a vertical section of the same, the pattern being shown in full lines. Fig. 5 is a side view, and Fig. 6 a vertical section, of the apparatus used in forming cores.

Like letters of reference indicate like parts in each.

My invention relates to the method of forming molds and cores for casting with iron, steel, brass, or other metals. Heretofore the method adopted for forming these molds has been by packing or ramming the sand or earth around the pattern by means of tools formed for the purpose, the workman throwing in some earth on the pattern and ramming it, and then filling in and ramming more until the flask was packed. Where a two-part flask was used the flask was then inverted and the other half of the mold formed in the same manner, and the pattern then removed. This method was very objectionable, especially in the manufacture of fine castings, for the following reasons: In ramming the sand on the pattern some parts would be rammed harder and more solidly than others, thus leaving soft spots on the surface of the mold, in which the molten metal, being heavy, would sink or press, and thus form swells and other irregularities in the casting. When the earth or sand was rammed as above described, wherever it was packed very solidly against the pattern it would have a tendency to stick and adhere to the pattern upon its removal, thus sometimes spoiling the mold altogether, and often marring its surface. On account of the uneven ramming of the mold the casting would often fin at the joint between the two parts of the flask. It has also been extremely difficult to form molds for casting tubular articles where made in a one-part flask, and cores for such articles, on account of the small space in which the workman had to ram. It will thus be seen that in rapid work it is practically impossible to form the molds with a uniformly smooth and hard surface, and that the castings would often be out of shape on account of the metal pressing into the soft spots in the mold. For these and other important reasons, another method by which a mold having a uniformly smooth and hard surface could be made has long been sought after.

My invention has for its object the remedying of these objections and supplying this need; and it consists, first, in the employment of a reservoir above the flask and attached thereto during the operation of jarring the sand, in order to insure that a sufficient density or firmness shall be produced in the sand within the flask, as will be explained; secondly, in certain apparatus by which my invention is more rapidly and easily applied to practice.

To enable others skilled in the art to carry out my invention, I will describe the same more fully.

In the drawings referred to, A represents a suitable frame-work or support, from which extend the table B and brace C. In the said table and brace are formed the guides *b* and *c*, in which the bar *d*, carrying the stand D, is journaled and slides vertically. Below the bar *d*, upon the base of said support A, or upon the floor, is the block E for the reception of the jar, which is preferably made of iron or like heavy substance. The stand D and its bar *d* may be lifted by a lever, or in other suitable manner, in the guides *b* and *c*, and allowed to fall upon the block E, thus imparting a vertical jar to the stand. Upon the support A, back of the stand D, is the shelf *a* for holding the sand-reservoir, (shown thereon in dotted lines,) referred to hereinafter. This shelf *a* is made vertically adjustable by means of a bolt $a$, which passes through a slot, $a^2$, in the supporting-standard $a^3$, to suit it to any height of flask which may be used.

Upon the stand D is placed the flask F, which is made in two parts—the cope G and the drag H—clamped or secured together by dowel-pins $f$, or in other suitable way, the flask being provided with the usual bottom board, $f'$. In the cope G of the flask are formed the recesses $i$, within which the pattern P rests, the lips $p$ passing over the dowel-pins $f$ of the flask. If desired, other rests for the pattern may be formed in the inside of the cope, or other means used for hanging it therein. Above the flask F, removably attached thereto by means of hooks or suitable clamps, $k$, is the reservoir K, for holding the sand and feeding it to the flask.

The manner of carrying out my improved method as applied to partible flasks is as follows: The flask F is placed upon the stand D, the cope G resting upon a bottom board, $f'$, and the pattern P in the recesses $i$, the drag H being on top of the cope. The shelf $a$ having been adjusted so as to be on the same level as the top of the flask, the reservoir K, resting thereon, is filled with sand. The drag H is then filled with sand by drawing the reservoir K onto the flask and, if necessary, giving it a slight jar. The reservoir K is then slid onto the shelf, thus leveling off the top of the flask. The drag may, however, be filled by the workman with his shovel in the usual manner. A bottom board is placed on the flask, and it is inverted. The reservoir is slid on, as above described, and attached to the cope by the hooks $k$. The stand D, with the flask and reservoir resting upon it, is then lifted by a lever or in other suitable way, and allowed to fall upon the block E, thus imparting a vertical jar to the flask and causing the sand to conform itself to the pattern. After this is repeated three or four times the sand is settled down sufficiently to form the mold. The recesses $i$ in the cope G are made sufficiently deep to allow the pattern to sink down with the sand at the time of the jar, and thus pack the sand of the drag H and bring the pattern at, or nearly at, the opening between the two parts of the flask. The reservoir K is then unhooked and slid off, carrying with it the surplus sand and leveling the top of the mold, the pouring-holes formed, the cope G lifted from the drag H, and the pattern lifted out, and after replacing the cope the mold is ready for casting.

If a shallow sand-reservoir is used, it may be attached to the cope before the operation is commenced; and in order to insure the solid packing of the sand, a flat weight, L, fitting into the reservoir, is placed on the sand before the flask is jarred. This weight L will overcome any tendency of the sand to spring back, and, following up the force of the jar, will pack the sand much tighter. Thus it will be seen that the weight L is supplemental to the surplus sand which is ordinarily left in the reservoir at the close of the jarring operation, and insures that a sufficient density shall be given to the sand within the mold. This is only necessary, however, in shallow flasks. If desired, the sand in the drag H may be jarred to the solidity required at the time the drag is filled from the reservoir.

Figs. 3 and 4 represent my invention as used in one-part molds for the manufacture of wagon-boxes and like tubular articles. The pattern-holder N, in which the pattern O fits, (being either rigidly attached thereto or removable therefrom, as desired,) is held in proper relative position to the flask M by means of the guides $n$. Attached to the other end of the flask is the sand-reservoir R, which is secured thereto by the guides $r$. The flask and reservoir are filled with sand and submitted to the jarring process, as above described. The reservoir, with the surplus sand, is then removed, the flask inverted, the holder N and pattern O lifted off and out, when the mold is formed, and when the core is placed therein is ready for casting. The guides $r$ are placed on only three sides of the reservoir R, so that it may be slid from the flask, and thus level it off.

Figure 6:
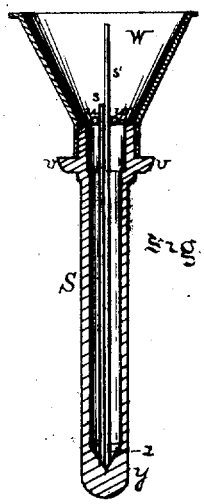

In Figs. 5 and 6 is shown the manner employed by me for making cores for casting wagon-boxes and like articles. It is necessary to have a rod passing through the core to give the requisite support, and also, in molding, to form a vent-hole for the escape of the gas by means of a wire passing through it. The space around these (the rod and wire) is so small that it is almost impossible to ram a hard smooth core.

S represents the core-box in which the core is formed, which is made with a closed or solid base, $y$, sufficiently strong to take the jar in forming the core. In the base $y$ is formed the recess $z$ for holding the lower ends of the strengthening-rod $s$ and vent-wire $s'$ in the center of the core. Above the core-box S is the sand-reservoir W, made of sheet-iron or other suitable material, and provided with an annular recess in which the mouth of the core-box fits. Across or partially across the base of the reservoir is the bar $w$, provided with the ring $u$ in the center, to hold the upper ends of the strengthening-rod and vent-wire in the center of the core-box.

If the base of the core-box is made open, it will be necessary to use a jarring-block to hold the base of the core-box, center the wires, and take the force of the blow.

The rod $s$ and wire $s'$ are placed in the recess $z$, and the reservoir W placed on the core-box, as above described, thus centering the rod and wire. The sand is then jarred through the reservoir into the core-box until sufficiently packed, when the reservoir is turned, thus causing the rod $w$ to cut off the surplus sand from the top of the core. The reservoir is then lifted off, the vent-wire drawn out, the box inverted, and the core removed from the core-box by a slight jar on the lug $v$ and properly dried. It is not necessary to use the reservoir W, as the wires may be held and the sand fed by hand.

By my improved method of jarring the flask or core-box a mold or core having a uniformly smooth and hard surface, without any soft spots, and much more solid than by the old method, can be formed. The jarring will also force the sand into every crack and crevice and cause it to conform itself to the shape of the pattern, and thus produce a perfect mold. As the mold is uniformly packed, there is no tendency of the sand to stick and adhere to the pattern. It also overcomes the difficulty of ramming in narrow or small places—such as in making wagon-boxes and cores—as no ramming is needed whatever.

I have shown and described two methods of scraping or leveling the sand on the top of the flask or mold by means of a cutting-edge attached to and moving with the sand-reservoir, whereby, when the reservoir is removed from the flask, the mold is left in a smooth and finished condition. In the construction represented by Figs. 5 and 6 this operation is performed by means of the knife or cutter, while in the other construction the same operation is performed by the lower edge of one side of the reservoir.

I am aware that molds have heretofore been made by jarring the sand in the flask for the purpose of packing it; but I believe I am the first to employ a sand-reservoir in combination with the flask in such manner as to be able to keep during the process of forming the mold an amount of sand upon the flask or core-box in excess of the amount required to pack said flask or core-box. This reservoir is very important, from the fact that unless such reservoir be used the sand in the upper part of the flask will not be packed enough to make it sufficiently solid, but will be left in a loose and spongy condition.

The reservoir, when employed in combination with a flask which is jarred, performs an entirely different function, so far as relates to the density of the sand in the upper part of the flask, from the effect produced by a reservoir upon a flask in which the sand is packed by compression or ramming, in that when rammed or compressed the sand is firmest at the top and least solid or compact next the pattern, so that the greater the depth of sand in the reservoir when the packing is completed the less dense the sand will be next the pattern, whereas when a mold is jarred the sand is more dense and compact at the pattern than it is near or at the upper face of the flask, for which reason the more sand left in the reservoir when the jarring is completed the firmer the sand will be next the pattern.

It is evident that the apparatus described for imparting the jar to the flask may be dispensed with or other suitable apparatus substituted therefor without departing from the spirit of my invention.

No claim is made herein to the special apparatus employed for the formation of cores, that being claimed in another division of this application.

What I claim, and desire to secure by Letters Patent, is—

1. The herein-described method of forming molds or cores by jarring a flask or core-box having applied thereto a reservoir containing an amount of sand in excess of that required to fill the flask or core-box, whereby the desired density or firmness in the upper portion of the sand is obtained, substantially as set forth.

2. The stand D, sliding vertically in suitable guides, for imparting a jar to the flask, substantially as described.

3. The combination of the frame or support A, stand D, sliding vertically in suitable guides, and the block or weight E, substantially as and for the purposes set forth.

4. The combination of the jarring-stand, flask, and sand-reservoir, substantially as and for the purposes set forth.

5. The adjustable shelf *a*, in combination with the sand-reservoir and flask, substantially as and for the purposes set forth.

6. The partible flask F, having the recesses *i* formed between the two parts thereof, to permit the vertical movement of the pattern during the formation of the mold, substantially as described.

7. The combination of the flask, sand-reservoir, and weight or follower L, placed in said reservoir, substantially as and for the purposes set forth.

In testimony that I claim the foregoing I have hereunto set my hand this 15th day of November, 1881.

S. JARVIS ADAMS.

Witnesses:
F. G. KAY,
JAMES I. KAY.